United States Patent
Corazzari et al.

(10) Patent No.: US 12,182,392 B2
(45) Date of Patent: Dec. 31, 2024

(54) METHOD FOR CONTROLLING A FOOD HANDLING SYSTEM

(71) Applicant: Tetra Laval Holdings & Finance S.A., Pully (CH)

(72) Inventors: Gianni Corazzari, Cavezzo (IT); Luisa D'Amato, Modena (IT); Fabio Lugli, Castelnovo di Sotto (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 18/004,291

(22) PCT Filed: Jun. 30, 2021

(86) PCT No.: PCT/EP2021/067999
§ 371 (c)(1),
(2) Date: Jan. 4, 2023

(87) PCT Pub. No.: WO2022/008314
PCT Pub. Date: Jan. 13, 2022

(65) Prior Publication Data
US 2023/0144412 A1  May 11, 2023

(30) Foreign Application Priority Data
Jul. 6, 2020  (EP) .................... 20184141

(51) Int. Cl.
*G06F 3/04883* (2022.01)
*G06F 3/04847* (2022.01)

(52) U.S. Cl.
CPC ...... *G06F 3/04883* (2013.01); *G06F 3/04847* (2013.01)

(58) Field of Classification Search
None
See application file for complete search history.

(56) References Cited

U.S. PATENT DOCUMENTS 9,530,068 B2 * 12/2016 Biegert ............... G06V 30/412
10,088,887 B2 * 10/2018 Lyu ....................... G06F 1/3206
(Continued)

FOREIGN PATENT DOCUMENTS

| GB | 2513456 | 10/2014 |
| WO | WO 2007/047702 | 4/2007 |
| WO | WO 2009/083595 | 7/2009 |

OTHER PUBLICATIONS

Schönig, Stefan, et al., "Digital Connected Production: Wearable Manufacturing Information Systems", Oct. 23, 2017, Advances in Databases and Information Systems; [Lecture Notes in Computer Science; Lecture Notes Computer], Springer International Publishing, pp. 56-65, ISBN: 978-3-319-10403-4.

(Continued)

*Primary Examiner* — Tuan S Nguyen
(74) *Attorney, Agent, or Firm* — Knobbe, Martens, Olson & Bear, LLP (57) ABSTRACT

A method for controlling a food handling system comprising a number of food production units by using an operator carried device. The method comprising: receiving process data by a server, wherein the process data is extracted from the food handling system, wherein the process data comprises parameter values captured via sensors provided in the food production units, requesting user input data by transmitting a user input data request to the operator carried device, receiving the user input data via the operator carried device, determining control data based on the process data and the user input data, transmitting the control data to the food production units, and updating settings in the food production units based on the control data.

18 Claims, 5 Drawing Sheets

(56) References Cited

U.S. PATENT DOCUMENTS

| | | | | |
|---|---|---|---|---|
| 2010/0053614 A1* | 3/2010 | Jeys | .................. | G01N 15/1434 |
| | | | | 356/337 |
| 2010/0139992 A1* | 6/2010 | Delia | ..................... | G06V 40/37 |
| | | | | 178/19.01 |
| 2010/0309131 A1* | 12/2010 | Clary | ................. | G06F 3/03545 |
| | | | | 382/187 |
| 2013/0129162 A1* | 5/2013 | Cheng | ................... | G06V 40/20 |
| | | | | 382/124 |
| 2013/0255614 A1* | 10/2013 | Kitano | ................... | F02D 29/02 |
| | | | | 123/179.4 |
| 2014/0222522 A1* | 8/2014 | Chait | ................ | G06Q 10/0637 |
| | | | | 705/7.36 |
| 2015/0067485 A1* | 3/2015 | Kim | ..................... | G06F 3/0488 |
| | | | | 715/256 |
| 2015/0268282 A1* | 9/2015 | Ahmadi | ................. | G06Q 50/04 |
| | | | | 702/62 |
| 2015/0287318 A1 | 10/2015 | Nair et al. | | |
| 2017/0364320 A1 | 12/2017 | Elumalai et al. | | |
| 2018/0018629 A1* | 1/2018 | Elston | ................ | G06Q 10/0875 |
| 2018/0285321 A1* | 10/2018 | Antony | ................ | G06V 30/153 |
| 2019/0033833 A1 | 1/2019 | Acharya et al. | | |
| 2020/0065601 A1* | 2/2020 | Andreassen | ......... | G06V 30/347 |

OTHER PUBLICATIONS

Extended European Search Report in European Application No. 21182713.4 dated Dec. 16, 2021 in 10 pages.

International Search Report and Written Opinion in International Application No. PCT/EP2021/067999 dated Sep. 28, 2021 in 13 pages.

* cited by examiner

Info A:

Info B:

Info C:

Preview    Save

Fig. 3a

Info A:

THIS IS MY COMMENT #1

Info B:

THIS IS MY COMENT #2

Info C:

THIS IS MY COMMENT #3

Preview    Save

Fig. 3b

Info A:

| This is my comment #1 |

Info B:

| This is my ~~coment~~ comment #2 |

Info C:

| This is my comment #3 |

[ Preview ]   [ Save ]

METHOD FOR CONTROLLING A FOOD HANDLING SYSTEM

TECHNICAL FIELD

The invention is related to packaging technology. More particularly, it is related to controlling a food handling system comprising a number of food production units, by using an operator carried device.

BACKGROUND ART

Today it is common practice for operators to use pen and paper while collecting data during inspections and maintenance operations of packaging lines and processing lines. The inspections and maintenance operations are mainly performed in production halls and warehouses. Usually, the operators collect data following standard operating procedures at a plant level. An advantage by using pen and paper is that it provides a high level of flexibility. In case operating procedures change, and a different content is to be collected, this generally does not pose a problem when using pen and paper. Further, pen and paper is universally accepted.

A drawback with today's solution of using pen and paper is that it may be difficult to find the correct paper, with the correct information, as well as it may be difficult to manage different versions of the information. A yet further drawback is that it may be cumbersome to transform the information to e.g. digital data sources while the information is on a paper. To overcome the above stated drawbacks, the data may be manually transferred from the paper to a computer, a procedure which is both time consuming and ineffective.

As an alternative to the solution of using pen and paper, it is today also common practice to use computers instead. An advantage by using computers is that the operators do not need to transfer the collected information but are inserting the information in the correct format directly. This provides for a more efficient procedure of collecting and storing the data. Further, by using the computer, the risk of using an obsolete version of a form can be reduced.

Even though using the computers for collecting the data from the operators generally works well, there is a need for further improvement in terms of flexibility, in terms of data quality and in terms of responsiveness.

SUMMARY

It is an object of the invention to at least partly overcome one or more of the above-identified limitations of the prior art.

According to a first aspect it is provided a method for controlling a food handling system comprising a number of food production units by using an operator carried device. The method comprising:
  receiving process data by a server, wherein the process data is extracted from the food handling system, wherein the process data comprises parameter values captured via sensors provided in the food production units,
  requesting user input data by transmitting a user input data request to the operator carried device,
  receiving the user input data via the operator carried device,
  determining control data based on the process data and the user input data,
  transmitting the control data to the food production units, and
  updating settings in the food production units based on the control data.

By the term "operator carried device" is here meant a device configured to receive and analyze data, both the process data and the user input data. The device should be of a size able for the operator, also referred to as user herein, to carry while performing the inspections and maintenance operations in the production halls and warehouses.

By the term "process data" is here meant any data being manually or automatically collected by the sensors provided in the food production units. The process data may be real-time data, illustrating status of the food handling system in real time. According to non-limiting examples, the parameter values of the process data may comprise pressure, flow, produced packages per time unit etc.

By the term "user input data" is here meant data being manually or automatically input by a user, such as an operator of the food handling system, to the operator carried device. Further, the user input data can be quality parameter data for a package sample, e.g. data related to placement of cap compared to transversal sealing.

By the term "user input data request" is here meant a request that the user input data may respond to. According to a non-limiting example, the user input data request may be based on a request from e.g. the food handling system, a production manager, a shift leader or an alarm.

An advantage with the disclosed method using an operator carried device is that it is possible for the operator to carry the device at all time. This will provide for a more effective collection of data since the operator can collect the data in the correct format from the beginning without any need of transferring the data from a paper to a computer or running to a stationary computer to insert the data. Thus, having the operator carried, the responsiveness of the system can be improved since the user input data is made available quicker. Further, having the operator carried device, this can be customized for specific needs of a specific user, which will as an effect further increase responsiveness.

A further advantage is that the control data, used for updating the settings in the food production units, is based on both the process data, received from sensors within the food production units, but also on the user input data, received from the user. Thus, the settings are updated based on a combination of data, wherein both the process data and the user input data are quickly received, and hence, the settings may be quickly updated. The faster the settings may be updated, the easier it is to avoid problems that may occur based on incorrect settings of the food production units. Thus, the responsiveness may be improved, and a more reliable and flexible control of the food handling system may be achieved.

In addition, the user input data can be requested to fill any information gaps formed by the process data. For instance, in case the system identifies that there is not enough information about a particular part of the system for making a reliable conclusion about the condition of this part, the user input data request can be made such that the user input data addresses this particular part of the system. Hence, in addition, or instead of, to being used in combination, the user input data can be used as a complement to the process data.

By the present disclosure, it takes benefit of all collected data in order to provide for a reliable and efficient solution. Further, by taking benefit of all collected data, it may be possible for the operator to response to the user input data request. The user input data request may comprise a question or a request to send a command in real time to perform a check. The check may be based on a previous input provided by the same operator. The check may be based on a new condition at the plant level, e.g. a request coming from a production manager, a shift leader, an alarm or based on process data. Thus, the user input data request may be based on an automatically or a manually request.

Yet an advantage with the disclosed method is that it facilitates for a more efficient daily work routine for customers using the food handling system in combination with the operator carried device.

The user input data may comprise a package sample identification received via a code provided on a package sample by using a camera of the operator carried device.

By introducing the package sample identification in the user input data may provide for an improved traceability of packages. An advantage with improved traceability is that, if one package sample may be identified with a problem, it may be possible to trace the other package samples within the same batch, that may have been exposed to a similar problem. This in combination with the improved responsiveness of using the operator carried device provides for that insufficiently processed or packaged products can be detected quicker, which is e.g. important from a food safety perspective.

The method may further comprise determining the user input data request based on the process data.

An advantage by determining the user input data request based on the process data is that a dynamicity between the process data and the user input data may be achieved.

A further advantage, wherein the carried operator device being able to interact with other data stored on any database including the process data from the food production units, is that the user input data request may be up to date and requesting information relevant for the food handling system at the moment. Thus, there may less delay in the user input data request nor that the request may ask for information that may not be relevant any longer.

The method may further comprise receiving an operator identification, wherein the operator identification is determined by using the operator carried device.

An advantage with being able to identify the operator is a user interface of the operator carried device can be adjusted to specifically fit this operator. For instance, in case the operator is asked to perform a check for the first time, additional instructions may be provided on the screen to provide for that the check is made as intended.

The operator identification may be made by using biometric identification. For instance, face recognition and/or fingerprint recognition may be used. The operator may be identified at the same time as the device is unlocked.

The method may further comprise:
determining operator specific characteristics by using the operator identification and a historical user input database, and
adjusting the user input data based on the operator specific characteristics.

Since there may be individual differences among operators and different situations and events may be interpreted differently, it is possible by knowing the operator identity to use historical data linked to this operator for adjusting the user input data such that data from different operators can be compared more reliable.

The method may further comprise capturing a handwritten text using the operator carried device and transforming the handwritten text to the user input data.

The handwritten text may also be used for identifying the operator, either in itself or in combination with e.g. face recognition data. The handwritten text may also be used for determining a state of the operator when entering the user input data, e.g. it can be detected from the handwritten text if the operator is stressed out or calm. This is made possible by comparing with historical data for the specific operator, but also by using general learnings on how handwritten text reflect a state of the person writing it.

By the term "capturing" or "collecting" is here meant obtaining information in a general sense. The information can be handwritten text, text entered using a key board, speech, images captured using the camera of the operator carried device, etc.

By the term "handwritten text" is here meant that the user may input the user input data to the operator carried device by handwriting the information on the operator carried device. The user may also provide the user input data by handwriting the information on a paper and take a picture of the paper. The handwritten text on the operator carried device and the handwritten text on the paper may be transformed to the user input data, such that the user input data may comprise the handwritten text.

An advantage by allowing the operator to using handwriting on the operator carried device may provide for a simplified and flexible way of input information to the operator carried device.

The method may further comprise:
extracting handwriting text features from the handwriting text of the user input data;
receiving a handwriting text template;
extracting handwriting text template feature from the handwriting text template;
comparing the handwriting text features and the handwriting text template features; and
if a match is found, requesting for the operator identification corresponding to the handwriting text template features.

The method may further comprise:
analyzing the handwriting text and if the handwriting text is linked to one of a number of pre-determined options;
confirming the handwriting text;
converting the handwriting text to digital text; and
storing the digital text on an onsite database;
else
performing one or more modifications to the handwriting text;
analyzing the modified handwriting text and if the modified handwriting text is linked to one of the numbers of pre-determined options;
confirming the modified handwriting text;
converting the modified handwriting text to digital text; and
storing the digital text on the onsite database.

By the term "modifications" is here meant modify the user input data such that it may be linked to one of a number—of pre-determined options. According to one non-limiting example, the modification may be to correct a misspelled word. The modifications may be manually performed by the user. The modifications may be automatically performed by the operator carried device.

The method may further comprise:
comparing the user input data with reference user input data; and
if the user input data differs from a predetermined input range associated to the reference user input data, stopping the food handling system.

An advantage by comparing the user input data with reference user input data is that it may be possible to identify if the user input data comprises relevant and correct information. It may further be possible to identify if the user input data may have been input in a correct way.

A further advantage by analyzing the user input data in the disclosed way is that it may provide a lot of value and knowledge about the customers work at the plant level. It may also provide knowledge about how the customers take decision.

A yet further advantages is that it may be possible to analyze what the content in which a problem happened may be.

Thus, it may provide for a more user-friendly and efficient monitoring service, preventing problems to occur and being one step ahead for the customers.

Thus, if the user input data is out of range, it may be possible to stop the food handling system before a problem may occur. It may also be possible to create an alert to other operators of the system in order for them to take action. It may be possible to analyze the information such that a maintenance operation may be performed preventively.

The step of requesting user input data may further comprise:
providing a user of the food handling system with a user guide; and
guiding the user, based on the user guide, through a process related to the user input data request.

By the term "user guide" is here meant a template or a chat bot, wherein the chat bot is using artificial intelligence. Thus, the user guide should be interpreted as a guide for the user such that the user inputs the user input data in a correct way but also that the user input data is relevant data compared to the request. The user guide may be guiding the user through the process. The template may comprise text boxes and grid control to guide the user where to type and what to type. The template may be updated over time based on the process data or based on the user input data request.

The user operator carried device may comprise the user guide.

By introducing the user guide that may be guiding the user through the process may provide for a more efficient process due to that the user known what to do.

The operator carried device may be a handheld device or a wearable device.

By the term "handheld device" is here meant any device the operator is able to carry, e.g. a tablet or a mobile phone.

By the term "wearable device" is here meant any device the operator may be able to wear, e.g. smart glasses, a smart watch or other portable devices with a camera.

If the carried device may be a wearable device, the method may further comprise:
capturing the handwriting text using the wearable device, wherein the wearable device is configured to convert the handwriting text to digital text; and
storing the digital text to the onsite database.

According to a second aspect, a server configured to control a food handling system comprising a number of food production units is provided. The server may comprise a transceiver, a control circuit and a memory, wherein
the transceiver may be configured to:
receiving process data, wherein the process data is extracted from the food handling system, wherein the process data comprises parameter values captured via sensors provided in the food production units;
requesting user input data by transmitting a user input data request to the operator carried device;
receiving user input data from the operator carried device; and
transmitting control data to the food production units; and
the control circuit is configured to execute:
a determination function configured to determine the control data based on the process data and the user input data: and
an updating function configured to update settings in the food production units based on the control data.

According to a third aspect, a system for controlling a food handling system comprising a number of food production units is provided. The system comprising:
the food handling system, wherein the food handling system comprises the number of food production units equipped with sensors;
an operator carried device configured to transmit user input data;
a server according to the second aspect;
an onsite database configured to store the user input data; and
an offsite database.

Still other objectives, features, aspects and advantages of the invention will appear from the following detailed description as well as from the drawings.

Effects and features of the second and third aspects are largely analogous to those described above in connection with the first aspect. Embodiments mentioned in relation to the first aspect are largely compatible with the second and third aspect. It is further noted that the inventive concepts relate to all possible combinations of features unless explicitly stated otherwise. A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

Embodiments of the invention will now be described, by way of example, with reference to the accompanying schematic drawings, in which.

DETAILED DESCRIPTION

Figure 1:
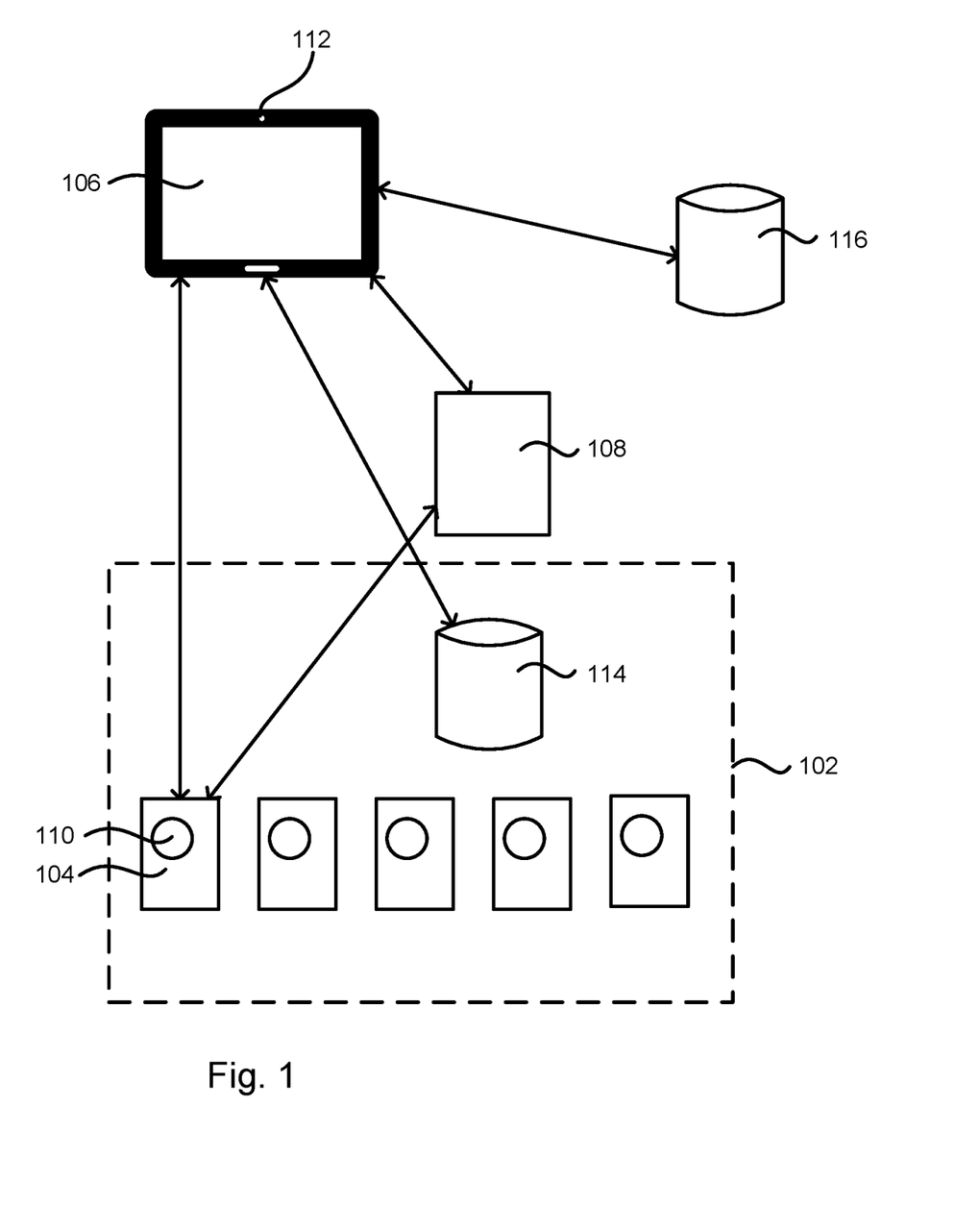
FIG. 1 illustrates a system for controlling a food handling system.

With reference to FIG. 1, a system 100 for controlling a food handling system 102 is illustrated by way of example. The system 100 may comprise the food handling system 102, an operator carried device 106 and a server 108. The server 108 will be discussed in more detail in connection with FIG. 2. The system 100 may further comprise an onsite database 114 and an offsite database 116.

Each device of the system 100 may be communicatively connected to any other device of the system 100. Thus, each device may be configured to transmit information to, or receive information from, any other device in the system. According to one non-limiting example, the food production units 104 may be configured to transmit information to the operator carried device 106. Each device of the system 100 may be communicatively connected to other devices, outside the system 100, as well. In this way, for instance, information from other plants may also be considered. Even though the different devices may be communicatively connected to each other, there may situations where information is not shared. For instance, business critical data may be chosen not to be shared. By using the onsite database 114 and the offsite database 116 it is made possible to hold the business-critical data in the onsite database 114 and data that can be shared with others in the offsite database 116. For instance, data related to handwriting recognition may be relevant to share with others in order to achieve sufficient data for making relevant conclusions.

The purpose of the system 100 is to facilitate collecting data at a plant level comprising the food handling system 102. A further purpose of the system 100 is to simplify the storing of data collected from the plant level comprising the food handling system 102. Further, the system 100 may provide for an efficient and flexible way of collecting and storing data.

The food handling system 102 may comprise a number of food production units 104. As illustrated in FIG. 1, the food handling system 102 comprises five food handling units 104. However, it should be understood that the food handling system 102 may comprise less than five food production units 104. It should also be understood that the food handling system 102 may comprise more than five food production unit 104. According to one non-limiting example, the food production units 104 may be packaging machines and/or processing lines. Thus, the food production units 104 may be configured to process food product, e.g. milk or juice, or producing food product packages from packaging material.

The food production units 104 may be equipped with sensors 110 for collecting process data from the food production units 104. The process data may be extracted from the food handling system 102. The process data may comprise parameter values captured via the sensors 110. The process data may be real-time data collected from the food production units 104. According to non-limited examples, the process data may comprise information related to the food production units 104, the food product or the packaging material. Thus, the process data may comprise information relating to pressure, flow, number of packages produced per time unit, vibrations, temperature, etc. The food production units 104 may be configured to transmit the process data, collected by the sensors 110, to the operator carried device 106. The food production units 104 may be configured to transmit information, collected by the sensors 110, to the server 108. An advantage obtained if the food production units 104 are transmitting the information to the operator carried device 106 is that the responsiveness may be decreased compared to if the information is transmitted via the server 108 to the operator carried device 106. By directly transmitting information from the sensors to the operator carried device or via the server 108, it is made possible to provide sensor output that may not be supported by a control system. Put differently, information about status of the system may be by-passed the control system. An advantage with this is that new additional features in the sensors 110 can easily be utilized.

The food production units 104 may be wired or wireless connected to the operator carried device 106 and to the server 108 in order to transmit information therebetween.

The operator carried device 106 may be equipped with a camera 112 and a screen. The operator carried device 106 may be configured to receive a user input data request. The user input data request may be based on the process data collected by the sensors 110 provided in the food production units 104. Put differently, the user input data request can be dynamically determined based on the process data. In this way, the user input data can be used for complementing the process data. The user input data request may be based on a request from a device or data outside the system 100 as well.

The operator carried device 106 may be configured to receive user input data from an operator of the food handling system 100, wherein the user input data may be based on the user input data request. The user input data may comprise free text. The user input data may be predetermined text or text alternatives. The user input data may comprise handwriting text or digital text. According to one non-limiting example, the user input data may comprise package sample identification received via a code provided on a package sample by using the camera 112 of the operator carried device 106.

The operator carried device 106 may further be configured to preview the user input data, wherein the user may accept or reject the user input data. The operator carried device 106 may allow the user to perform modifications of the user input data, which is further illustrated in FIG. 3c. The modification of the user input data may be performed manually, by the user, or automatically, by the operator carried device 106.

The operator carried device 106 may comprise a user guide. The user guide may be configured to guide the user, i.e. the operator, through a process related to the user input data request. The user guide may be a template or a chat bot. The user guide may be based on the process data. The user guide may be based on the user input data request. Thus, the user guide may indicate what type of information the user input data should comprise. If the user input data may comprise information related to e.g. pressure, the user guide may indicate what type of unit the user input data should have. The user guide will be discussed in more detail in connection to FIGS. 3a-c.

The operator carried device 106 may further be configured to determining an operator identification. According to one non-limiting example, the operator identification may be made by using biometric identification. The operator carried device 106 may further be configured to determine operator specific characteristics by using the operator identification and a historical user input database. The user input data may be adjusted based on the operator specific characteristics.

The operator carried device 106 may be configured to transmit information to the food handling system 102 and to the food production units 104. The operator carried device 106 may further be configured to transmit information to the server 108. The operator carried device 106 may further be configured to transmit information to onsite database 114 and the offsite database 116 for storing information thereon.

Figure 2:
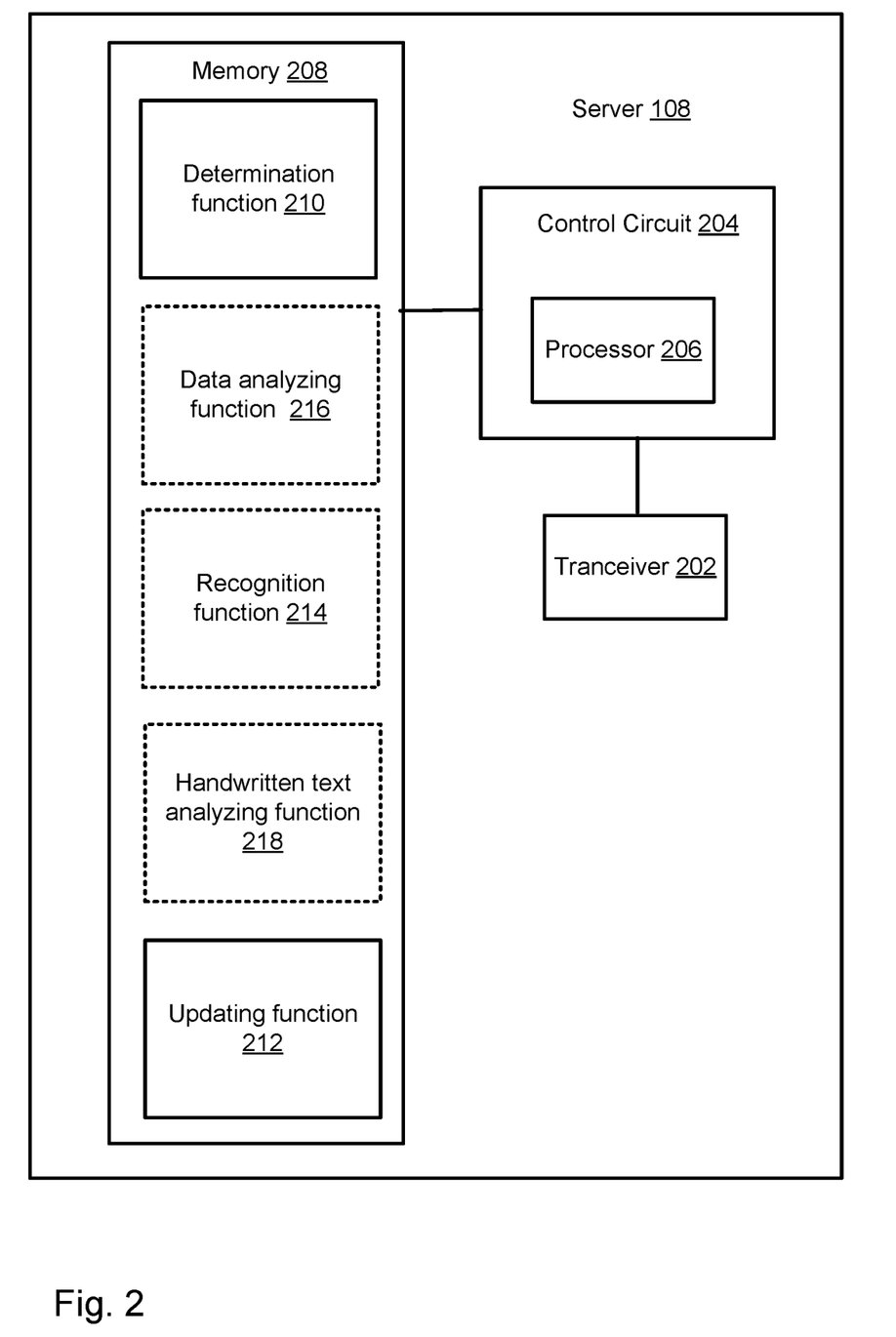
FIG. 2 illustrates a server configured to control a food handling system.

FIG. 2 illustrates a schematic view of the server 108. The server 108 may be configured for controlling the food handling system 102. The server 108 may comprise a transceiver 202, a control unit 204 and a memory 208.

The transceiver 202 may be configured to enable the server 108 to communicate with other devices, such as the food production units 104 and the operator carried device 106, but also the onsite database 114 and the offsite database 116. The transceiver 202 may be configured to receive the process data, wherein the process data may be transmitted from the food production units 104 or from the sensors 110 provided in the food production units 104. The transceiver 202 may be configured to transmit a user input data request to the operator carried device 106. The transceiver 202 may be configured to receive user input data from the operator carried device 106.

The control circuit 204 may be configured to perform control of functions and operations of the server 108. The control circuit 204 may include a processor 206, such as a central processing unit (CPU). The processor may be configured to execute program code stored in the memory 208 in order to perform functions and operations of the server 108.

The control circuit 204 may execute a determination function 210. The determination function 210 may be configured to determine the control data based on the process data and the user input data.

The control circuit 204 may execute an updating function 212. The updating function may be configured to update settings in the food production units 104 based on the control data.

The control circuit 204 may execute a data analyzing function 216. The data analyzing function 216 may be configured to analyze the process data and the user input data. The data analyze function 216 may further be configured to analyze the control data based on the process data and the analyze data. According to one non-limiting example, the data analyzing function 216 may be configured to compare the user input data with a user input data reference. If the user input data differs from a predetermined input range associated to the reference user input data, the data analyzing function 216 may be configured to stop the food handling system 102. Alternatively, or in combination, if the user input data differs from the predetermined input range associated to the reference user input data, the data analyzing function 216 may be configured to transmit an alarm signal to the operator carried device 106 indicating a mismatch. Thus, the data analyzing function 216 may be configured to analyze if the data is valid data.

Figure 3A:
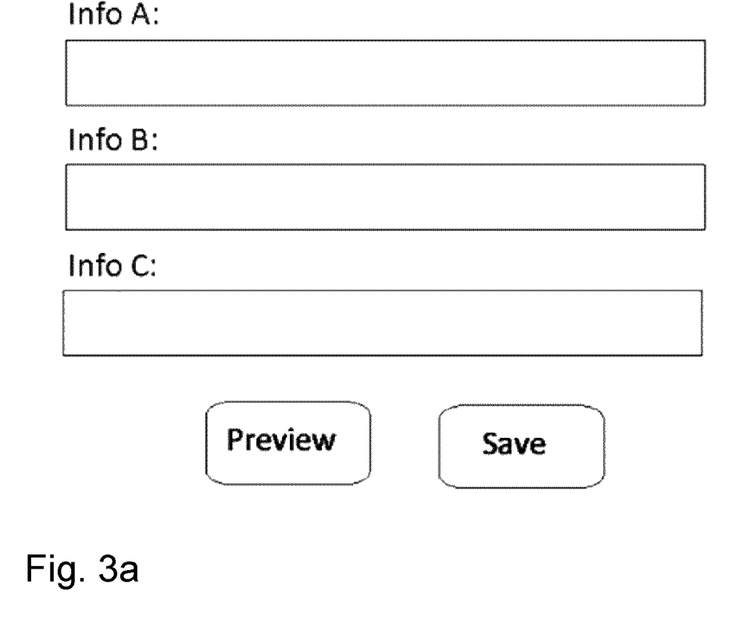
FIG. 3a-c illustrates an operator carried device comprising a user guide.
Figure 3B:
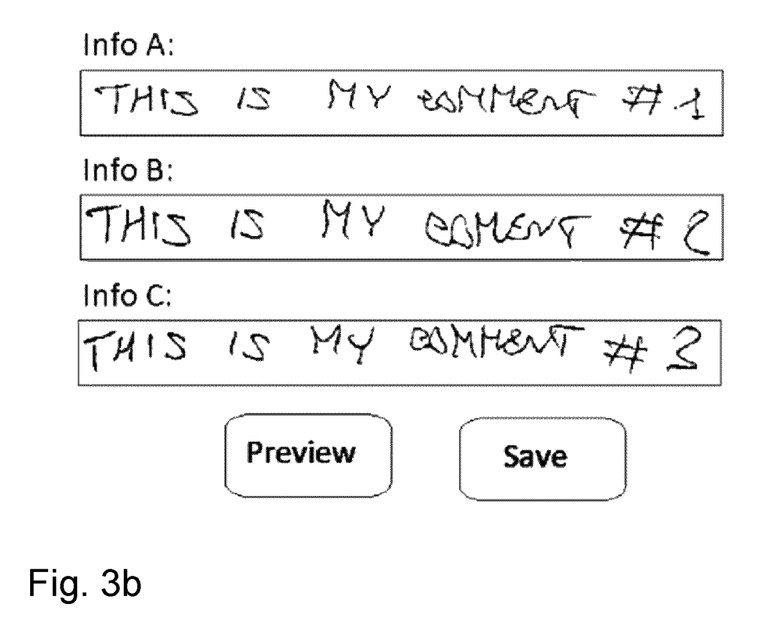
Figure 3C:
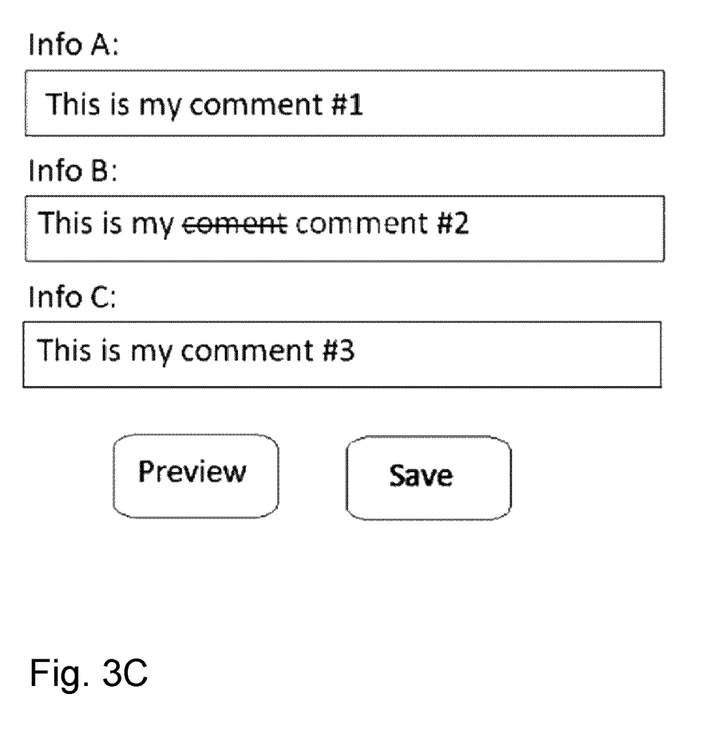

With reference to FIGS. 3a-c, an operator carried device 106 comprising a user guide is illustrated by way of example. In FIGS. 3a-c, the user guide is a template configured for guiding the user through a process.

FIG. 3a illustrates three boxes in which the user may input the user input data, either using handwritten text or digital text. Thereafter, it may be possible to preview the user input data or to save the user input data.

FIG. 3b illustrates the same view as in FIG. 3a, but after the user input data has been received in the three boxes, wherein the user input data comprises handwritten text. Allowing the user to use handwritten text instead of digital text simplifies the writing on the operator carried device 106. Thus, this provides for a more user-friendly and flexible way of collecting data. The operator carried device 106 may be configured to allow the user to handwrite alphanumerical text with a stylus but also punctuation marks, e.g. a question mark, exclamation point, period, comma, colon and semicolon. Thus, the operator carried device 106 may allow the user to input user input data comprising free text. The operator carried device 106 may allow the user to input user input data comprising predetermined text or text alternatives. The operator carried device 106 may be configured to preview the user input data, wherein the user may accept or reject the user input data. The operator carried device 106 may allow the user to perform modifications of the user input data, which is further illustrated in FIG. 3c. The modification of the user input data may be performed manually, by the user, or automatically, by the operator carried device 106.

As illustrated in FIG. 3c, the operator carried device 106 may be configured to modify the handwritten text. As further illustrated in FIG. 3c, the operator carried device 106 may be configured to convert handwritten text to digital text. The operator carried device 106 may be configured to store the digital text on the onsite database 114 or the offsite database 116. The digital text may be configured to be stored on the operator carried device 106.

To further facilitate or as an alternative, the user input data may be input as speech. By having a microphone in the operator carried device and a speech recognition software, the user may input using his voice. This may be the sole way of providing the user input data or it may be used in case the handwriting recognition software has misinterpreted the handwriting, i.e. as a back up to using handwriting recognition.

Alternatively, or in combination, the user guide may be a chat bot for guiding the user through the process. Upon that may be the case, the operator carried device 106 may be connected to a further operator carried device, wherein the further operator carried device may be a smart pencil. If the operator carried device 106 and the further operator carried device may be connected, the operator may be able to write the user input data on a paper using the further operator carried device and the operator carried device 106 may simultaneously reproducing the handwritten text.

Alternatively, or in combination, the user may be configured to use a pen and paper and thereafter capture a picture of the paper using the camera 112 of the operator carried device 106, wherein the operator carried device 106 may be configured to convert the handwritten text to digital text.

Alternatively, or in combination, if the operator carried device 106 is a wearable device, e.g. smart glasses, the wearable device can be configured to convert handwritten text to digital text. Thus, the wearable device may be configured to capture a picture comprising the handwritten text. The text capturing with the wearable device may be automatically or manually trigged by the user.

The concept presented above may be described as a general method as follows:

A method for controlling the food handling system 102 comprising a number of the food production units 104 by using the operator carried device 106, the method comprising:

connecting the operator carried device 106 to the number of food production units 104;

receiving process data by the server 108, wherein the process data is extracted from the food handling system 102, wherein the process data comprises parameter values captured via sensors 110 provided in the food production units 104;

generating a user input data template based on the process data;

receiving the user input data based on the user input data template via the operator carried device, wherein the user input data comprise handwritten text on the operator carried device 106;

converting the handwritten text to digital text; and storing the digital text.

The method may further comprise:

determining control data based on the process data and the user input data;

transmitting the control data to the food production units 104, and updating settings in the food production units based on the control data.

With reference to FIG. 2, if the user input data may comprise handwritten text, the control circuit 204 may execute the recognition function 214. The recognition function 214 may be configured to extract handwritten text features from the user input data that may comprise handwritten text. The recognition function 214 may further be configured to receive a handwritten text template and to extract handwritten text template features from the handwritten text template. The recognition function 214 may further be configured to compare the handwritten text features with the handwritten text template features. If a match is found between the handwritten text features and the handwritten text template features, the recognition function 214 may further be configured to request for the operator identification corresponding to the handwritten text template features.

An advantage by comparing the handwritten text features with the handwritten text template features may be that it provides for an analyze configured to determine whether the user is authorized as the valid user and if the user input data should be accepted.

With reference to FIG. 2, if the user input data may comprise handwritten text, the control circuit 204 may execute a handwritten text analyzing function 218. If the user input data comprises handwritten text, the handwritten text analyzing function 218 may be configured to analyze the handwritten text. If the handwritten text may be linked to one of a number of pre-determined options, the handwritten text analyzing function 218 may be configured to confirm the handwritten text, convert the handwritten text to digital text and store the digital text. If the handwritten text may not be linked to one of a number of pre-determined options, the handwritten text analyzing function 218 may be configured to perform modification to the handwriting text and analyze the handwritten text. If the modified handwritten text may be linked to one of a number of pre-determined options, the handwritten text analyzing function 218 may be configured to confirm the modified handwritten text, convert the modified handwritten text to digital text and store the digital text.

Thus, the handwritten text analyzing function 218 may be configured to analyze the handwritten text and verify that the handwritten text may be written in a correct format. According to one non-limiting example, the handwritten text analyzing function 216 may be configured to perform a grammar check.

Figure 4:
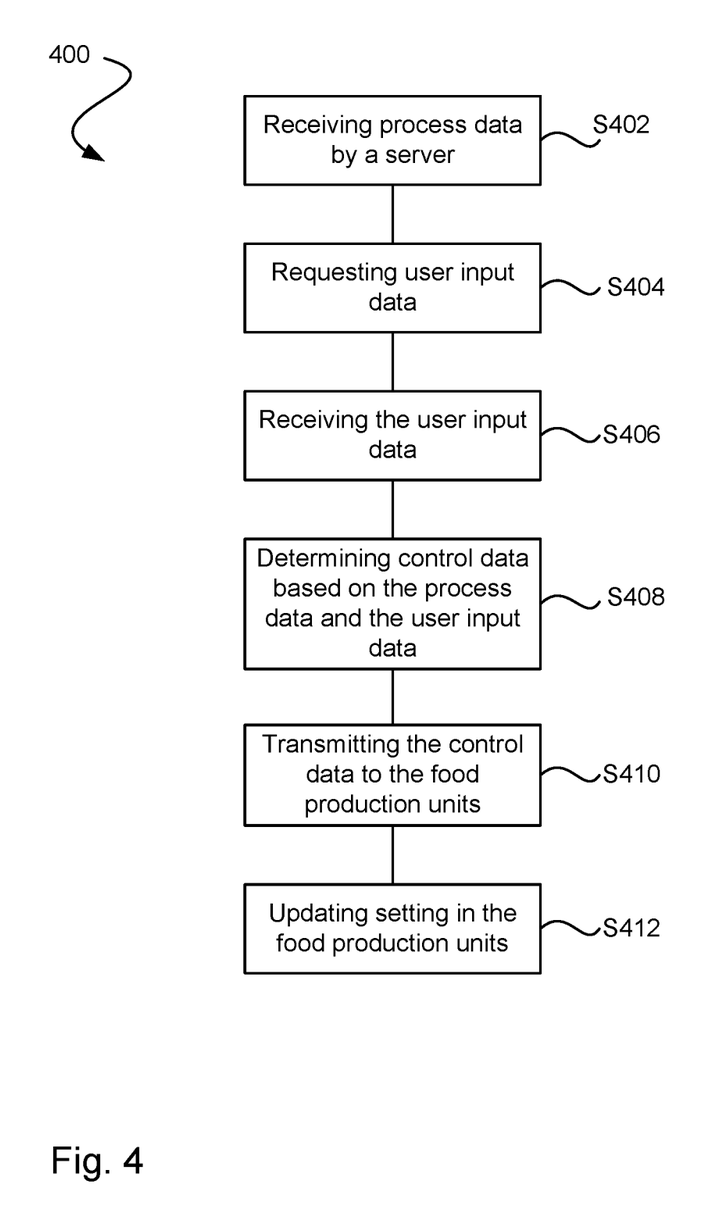
FIG. 4 is a flow chart illustrating a method for controlling a food handling system.

In FIG. 4 it is presented a flow chart illustrating a method 400 for controlling the food handling system 102 comprising the number of food production units 104 by using the operator carried device 106. According to one non-limiting example, the operator carried device 106 may be a handheld device, e.g. a tablet or a mobile phone. According to yet one non-limiting example, the operator carried device 106 may be a wearable device, e.g. smart glasses or a smart watch.

In a first step S402, process data can be received from the server 108. The process data can be extracted from the food handling system 102. The process data can comprise parameter values captured via sensors 110 provided in the food production units.

In a second step S404, user input data can be requested by transmitting the user input data request to the operator carried device 106. Optionally, the second step S404 may comprise determining the user input data request based on the process data. Optionally, the second step S404 may further comprise providing the user of the food handling system 102 with a user guide and guiding the user, based on the user guide, through a process related to the user input data request.

In a third step S406, the user input data can be received via the operator carried device 106. In a fourth step S408, control data based on the process data and the user input data can be determined. In a fifth step S410, the control data can be transmitted to the food production units 104. In a sixth step S412, settings in the food production units 104 can be updated based on the control data.

Optionally, the method 400 may further comprise receiving an operator identification. The operator identification may be determined by using the operator carried device 106. According to one non-limiting example, the operator identification may be made by using biometric identification. Optionally, the method 400 may further comprise determining operator specific characteristics by using the operator identification and a historical user input database. The user input data may be adjusted based on the operator specific characteristics.

Optionally, the method 400 may further comprise capturing a handwritten text using the operator carried device 106 and transforming the handwritten text to the user input data.

Optionally, if the user input data may comprise handwritten text, the method 400 may further comprise extracting handwriting text features from the handwriting text of the user input data. Receiving a handwriting text template. Extracting handwriting text template feature from the handwriting text template. Comparing the handwriting text features and the handwriting text template features. If a match is found, requesting the operator identification corresponding to the handwriting text template features. Thus, if the match is found, the user is authorized as a valid user and the user inputs may be used for updating the settings.

Optionally, if the user input data may comprise handwritten text, the method 400 may further comprise analyzing the handwriting text. If the handwriting text may be linked to one of a number of pre-determined options, the method 400 may further comprise confirming the handwriting text, converting the handwriting text to digital text; and storing the digital text on an onsite database. If the handwritten text may not be linked to one of a number of pre-determined options, the method 400 may further comprise performing modifications to the handwriting text and analyzing the modified handwriting text. If the modified handwriting text may be linked to one of the numbers of pre-determined options, the method 400 may further comprise confirming the modified handwriting text, converting the modified handwriting text to digital text and storing the digital text on the onsite database.

Optionally, the method 400 may further comprise comparing the user input data with reference user input data. Upon the user input data may differ from a predetermined input range associated to the reference user input data, the method 400 may further comprise stopping the food handling system 102.

Optionally, if the user input data may comprise handwritten text and if the operator carried device 106 may be the wearable device, the method 400 may further comprise capturing the handwritten text using the wearable device, wherein the wearable device may be configured to convert the handwritten text to digital text and storing the digital text.

Thus, the method 400 may be for controlling the food handling system 102 by receiving and processing different type of data, such that the process data and the user input data. The method 400 may further control the food handling system 102 by analyzing the user input data.

From the description above follows that, although various embodiments of the invention have been described and shown, the invention is not restricted thereto, but may also be embodied in other ways within the scope of the subject-matter defined in the following claims.

The invention claimed is:

1. A method for controlling a food handling system comprising a number of food production units by using an operator carried device, the method comprising:
   receiving process data by a server, wherein the process data is extracted from the food handling system, wherein the process data comprises parameter values captured via sensors provided in the food production units,
   requesting user input data by transmitting a user input data request to the operator carried device,
   receiving the user input data via the operator carried device, the user input data comprising handwriting text features extracted from handwritten text,
   comparing the handwriting text features of the user input data with handwriting text template features extracted from a handwriting text template to determine a match,
   at a first time, responsive to the match being determined:
      comparing the user input data with reference user input data,
      at a second time, responsive to the user input data being within a predetermined input range associated to the reference user input data:
         determining control data based on the process data and the user input data,
         transmitting the control data to the food production units, and
         updating settings in the food production units based on the control data, and
      at a third time, responsive to the user input data being different from the predetermined input range associated to the reference user input data,
   transmitting an alert to the user operator carried device indicating that the user input data is out of range, and
   at a fourth time, responsive to the match not being determined, rejecting the user input data.

2. The method according to claim 1, wherein the user input data comprises a package sample identification received via a code provided on a package sample by using a camera of the operator carried device.

3. The method according to claim 1, further comprising: determining the user input data request based on the process data.

4. The method according to claim 1, further comprising:
   at the first time, in response to the match being determined, receiving an operator identification corresponding to at least one of the handwriting text template features, wherein the operator identification is determined by using the operator carried device.

5. The method according to claim 4, wherein the operator identification is made by using biometric identification.

6. The method according to claim 4, further comprising:
   determining operator specific characteristics by using the operator identification and a historical user input database, and
   adjusting the user input data request based on the operator specific characteristics.

7. The method according to claim 1, wherein the method further comprising:
   capturing the handwritten text using the operator carried device; and
   transforming the handwritten text to the user input data to extract the handwriting text features.

8. The method according to claim 7, wherein the method further comprising:
   extracting the handwriting text features from the handwritten text of the user input data;
   receiving the handwriting text template;
   extracting the handwriting text template features from the handwriting text template; and
   at the first time, responsive to the match being determined, requesting for operator identification corresponding to the handwriting text template features.

9. The method according to claim 8, further comprising:
   performing one or more modifications to the handwritten text;
   confirming the modified handwritten text;
   converting the modified handwritten text to digital text; and
   storing the digital text on an onsite database for determining the control data based on the digital text, the user input data comprising the digital text.

10. The method according to claim 8, further comprising:
    receiving the operator identification associated with a valid user in response to the handwriting text features matching one of the handwriting text template features associated with the valid user, and
    in response to not receiving the operator identification, determining that the handwriting text features and the handwriting text template features do not match.

11. The method according to claim 1, wherein requesting the user input data further comprises:
    providing a user of the food handling system with a user guide; and
    guiding the user, based on the user guide, through a process related to the user input data request.

12. The method according to claim 1, wherein the operator carried device is a handheld device or a wearable device.

13. The method according to claim 12, wherein the operator carried device is the wearable device, and the method further comprises:
    capturing the handwritten text using the wearable device, wherein the wearable device is configured to convert the handwritten text to digital text; and
    storing the digital text to an onsite database for determining the control data based on the digital text, the user input data comprising the digital text.

14. The method according to claim 1, wherein requesting the user input data is dynamically requested based on the process data, and wherein the user input data fills an information gap formed by the process data or complements the process data.

15. The method according to claim 1, wherein the number of food production units comprises at least one of packaging machines or processing lines, the number of food production units configured to process at least one of liquid food products and liquid food product packages.

16. The method according to claim 1, wherein the user input data further comprises speech features extracted from user inputted speech, the reference user input data further comprises speech template features, and the match further comprises the speech features matching at least one of the speech template features.

17. The method according to claim 1, further comprising:
at the third time, responsive to the user input data being different from the predetermined input range associated to the reference user input data, automatically stopping the food handling system.

18. A server configured to control a food handling system comprising a number of food production units, the server comprising:
a transceiver, a control circuit, and a memory,
wherein the transceiver is configured to:
receive process data, wherein the process data is extracted from the food handling system, and wherein the process data comprises parameter values captured via sensors provided in the food production units;
request user input data by transmitting a user input data request to an operator carried device;
receive the user input data from the operator carried device, the user input data comprising handwriting text features extracted from handwritten text;
transmit control data to the food production units;
compare the handwriting text features of the user input data with handwriting text template features extracted from a handwriting text template to determine a match; and
compare the user input data with reference user input data;
wherein the control circuit is configured to execute instructions stored in the memory, the instructions causing the control circuit to:
in response to the match being determined and to the user input data being within a predetermined input range associated to the reference user input data:
determine the control data based on the process data and the user input data; and
update settings in the food production units based on the control data;
in response to the match being determined and to the user input data being different from the predetermined input range associated to the reference input data, transmit an alert to the operator carried device indicating that the user input data is out of range, and
in response to the match not being determined, reject the user input data.

\* \* \* \* \*